April 5, 1927.
C. G. GARRARD
1,623,052
MEANS FOR THE TRANSMISSION OF POWER
Filed Aug. 12, 1924    4 Sheets-Sheet 1
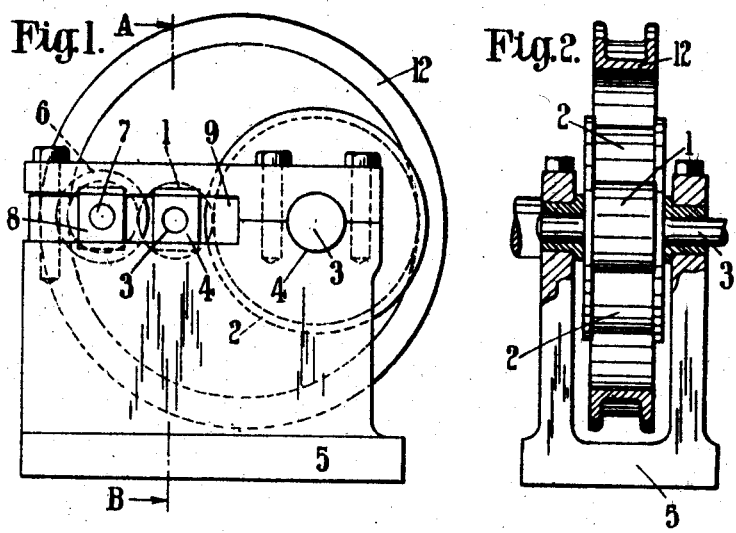
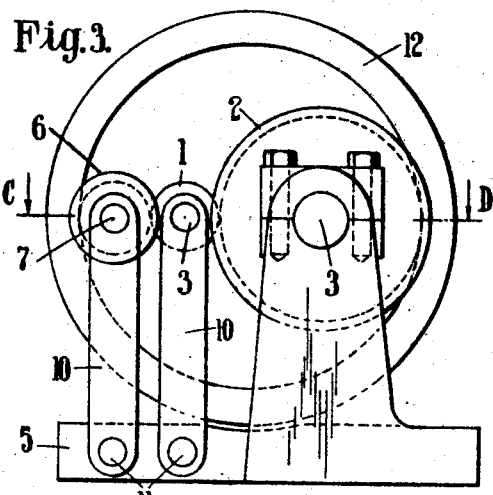
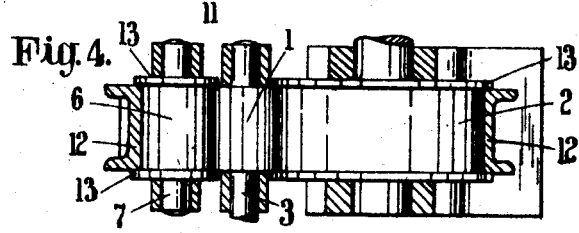
INVENTOR
Charles George Garrard
BY
Darby Darby
his ATTORNEYS April 5, 1927.

C. G. GARRARD 1,623,052

MEANS FOR THE TRANSMISSION OF POWER

Filed Aug. 12, 1924    4 Sheets-Sheet 2

INVENTOR
Charles George Garrard
BY
ATTORNEYS

April 5, 1927.  
C. G. GARRARD  
1,623,052  
MEANS FOR THE TRANSMISSION OF POWER  
Filed Aug. 12, 1924    4 Sheets-Sheet 3

INVENTOR  
Charles George Garrard  
BY  
ATTORNEYS

April 5, 1927.

C. G. GARRARD 1,623,052

MEANS FOR THE TRANSMISSION OF POWER

Filed Aug. 12. 1924   4 Sheets-Sheet 4

INVENTOR
Charles George Garrard
BY
Darby & Darby
his ATTORNEYS

Patented Apr. 5, 1927.

1,623,052

UNITED STATES PATENT OFFICE.

CHARLES GEORGE GARRARD, OF LONDON, ENGLAND.

MEANS FOR THE TRANSMISSION OF POWER.

Application filed August 12, 1924. Serial No. 731,565.

This invention relates to improvements in means for the transmission of power, and it relates more particularly to improvements in transmission gears suitable for a large variety of purposes, such as for example ordinary reduction or increase of speed, changing speeds and reversing direction of rotation. Gears constructed according to the invention are particularly suitable for turbine and other reducing gears, for automobile change speed gears, and for machinery generally.

According to the invention the power is transmitted with any desired increase or reduction of speed, or change of direction of rotation by means of driving and driven rollers, and the binding pressure is applied by means of rotating members. These rotating members consist of two idler members for each pair of driving and driven rollers. Accordingly one or more pairs of driving and driven rollers may be provided, with each of which pairs an idler roller and a surrounding and binding ring co-operate to produce the necessary binding pressure The particular increase or reduction of the speed will depend on the relative diameter of the driving and driven rollers, and may be varied within wide limits, provided that the construction of the parts and the elasticity of the materials employed are such that a sufficient area of contact is provided to enable the parts to transmit power at the particular speed and load in question.

The rollers and rings are all made with parallel contact faces and preferably of hardened and polished steel, and they are mounted on parallel axes. One or more of the rollers may be mounted on movable bearings so as to accommodate for any slip between the contacting rollers, and any change in the relative positions of the three co-operating rollers will cause a variation in the stress applied to and by their binding ring thus ensuring the necessary binding pressure, which is always proportional to the load being applied at all times. The parts may be arranged in various ways according to the desired direction and speed of rotation.

Gears constructed according to the present invention may be compounded and developed in various ways and may be constructed as change speed gears. In the latter case a plurality of sets of driving, driven and idler rollers, each set with its binding ring, are assembled together preferably in a suitable casing, and means are provided for selectively placing any desired set of rollers into driving position whilst leaving the others rotating idly, and means for reversing at will may also be provided.

The invention also comprises various arrangements of parts and constructional and other details incidental to or co-operating with gears having the characteristics above described.

Several preferred methods of carrying out the invention are illustrated in the accompanying drawings, in which:—

Fig. 1 is an elevation of one form of gear according to the present invention.

Fig. 2 is a section on the line A—B of Fig. 1.

Fig. 3 is an elevation of a gear similar to that of Fig. 1 but in which two of the rollers are mounted in a different manner.

Fig. 4 is a section on the line C—D of Fig. 3.

Figure 5:
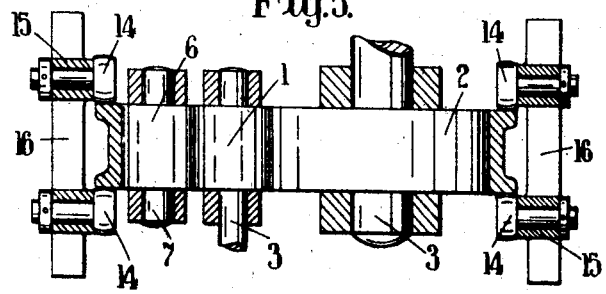
Fig. 5 is a sectional detail view showing an alternative method of maintaining the keeper ring in position laterally.
Figure 6:
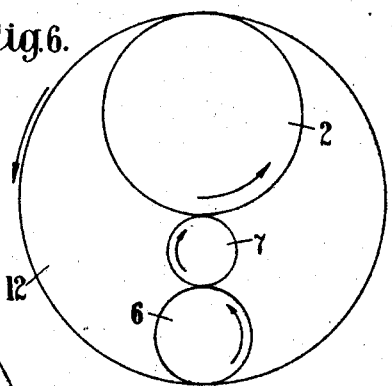
Figs. 6, 7 and 8 are diagrammatic views showing alternative methods of mounting the several parts.

Referring to the drawings, Figures 1–8 illustrate various modifications of a simple speed reducing or multiplying gear in each of which one driving, one driven and one idler roller are employed together with one binding ring. The three rollers can be arranged in three different ways as illustrated in the diagrams Figs. 6, 7 and 8, according to whether it is desired that the driving and driven members should rotate in the same or in opposite directions, and according to convenience of assembly and the like.

Referring to Fig. 1–6, and assuming the device is to be used as a reducing gear, the driving roller 1, and driven roller 2 are made integral with or secured to shafts 3 and are mounted in bearings 4 supported on the base 5 or other convenient part of the gear. The idler roller 6 may be loose on its shaft 7 and is also mounted in bearings 8 similarly supported. In the form illustrated in Figs. 1–6 the driving roller 1 is located between and contacts with the driven and idler rollers. If desired all these three shafts may be mounted at each end in ball or like bearings not shown. The three rollers are mounted in parallel, with the centres of their axes in alignment, and I prefer to arrange the driven roller 2 to be in a fixed bearing, whilst the driving roller 1 and idler 6, may be mounted in adjustable or movable bearings, as for example in bearings which are slidable in the slot 9 shown in Fig. 1 or in bearings which are pivotally supported by means of the links 10 pivoted at 11 to the base 5 or other convenient fixed part. A circular binding ring 12 is mounted around the two outer rollers, so as to bind the parts together and enable them to transmit power, for which purpose the internal diameter of the ring 12 may either be such as to be a close fit, or very slightly smaller than that. All contacting faces of the parts are made with parallel surfaces, and are preferably of hardened and polished steel.

Means are provided for keeping the parts in proper position and for preventing lateral slipping or creeping, and this may be accomplished in various ways, two of which are illustrated by way of example in Figs. 4 and 5. In the form illustrated in Fig. 4 the two outer rollers in this case the idler 6 and driven roller 2 are provided at each side with circumferential flanges 13, between the inner edges of which the driven roller 1 rotates, whilst the ring 12 is fitted and rotates between the said flanges at the opposite sides of the two rollers. In the form shown in Fig. 5 the rollers 1, 2 and 6 are constructed without flanges whilst the parts are retained in position laterally by means of a plurality of pairs of auxiliary rollers 14, rotating in bearings 15 mounted in any convenient part 16 of the casing or the like. These rollers 14 are disposed in pairs around the ring 12 and engage the sides of said ring, thus preventing the same from slipping or creeping laterally. The operation of this form of the device is as follows:—

When the gear is not in operation the centre of the three rollers 1, 2 and 6 and of the binding ring 12 are all in alignment. If the ring 12 has been made of slightly smaller diameter than the combined diameters of the three rollers, as above referred to, the ring will be stressed slightly into oval shape, and a certain amount of binding pressure will be thereby applied to the three rollers. If on the other hand this ring has been made to be an exact fit then the weight of the ring itself will apply this initial pressure to the parts. If now the driving roller 1 is rotated in a right hand direction, the driven roller 2, idler 6 and ring 12 will all rotate in a left hand direction, the gear ratio, between the rollers 1 and 2 being proportional to that of their respective diameters. If now the power rotating the driving roller 1 is increased, i. e. if its speed increases and the resistance of the driven roller 2 is also increased any tendency to slip between the two will cause the idler roller 6 to gain in surface speed relative to the driven roller whereby the centre of the binding ring 12 will be caused to move out of alignment with the centres of the three rollers. In this way the binding pressure exerted by the ring will be increased, and the slipping arrested, whereupon the gear continues to operate as before. In the event of the resistance of the driven roller increasing, the ring 12 will again accommodate itself to the changed conditions and prevent slipping, whilst on reduction of resistance or speed the stress on the ring will again vary correspondingly and the gear will continue to operate owing to the binding pressure applied by it.

Figure 7:
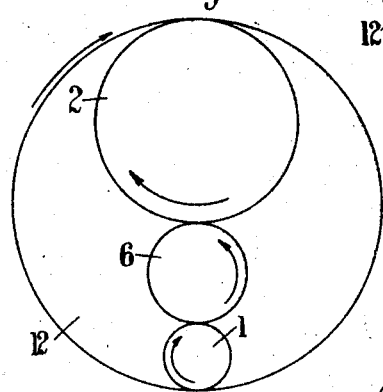
Figure 8:
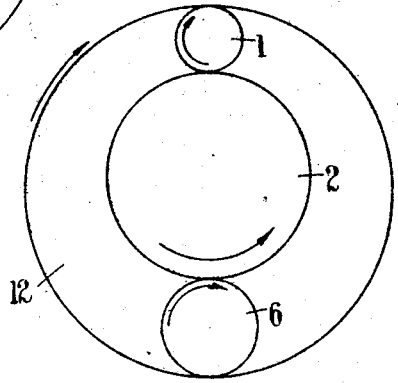

The rollers can of course also be arranged in the manners illustrated in Figs. 7 and 8. In Fig. 7 the idler 6 is arranged between the driven roller 2 and driving roller 1, and on the latter being rotated in a right hand direction the driven roller 2, and ring 12 will rotate in the same direction whilst the idler 6 will rotate in the opposite direction. This method of arranging the parts will thus be suitable where it is desired that the driving and the driven rollers should rotate in the same direction.

In some cases it may be preferred to arrange the driven roller 2 between the driving roller 1 and idler 6, as illustrated in Fig. 8. In this case the rollers 1 and 6 and the ring 12 will rotate in the same direction, whilst the driven roller 2 will move in the opposite direction. If desired any of the above described gears can of course be enclosed or mounted within any suitable form of cover or casing.

The method of power transmission described in the foregoing can of course be developed in various ways and gears of this kind can be compounded and arranged in different manners to suit different purposes without departing from the scope of the invention, and two of the many possible modifications are illustrated in Figs. 9–12.

Figure 9:
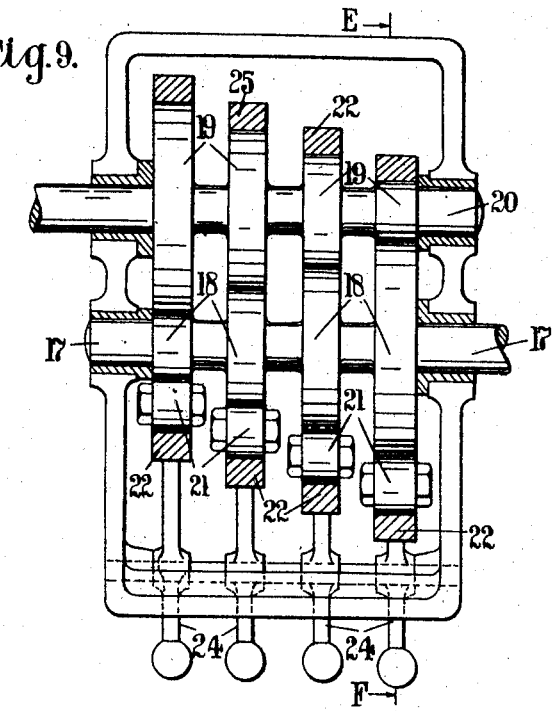
Fig. 9 is a central sectional elevation of a multiple speed gear constructed according to the invention.
Figure 10:
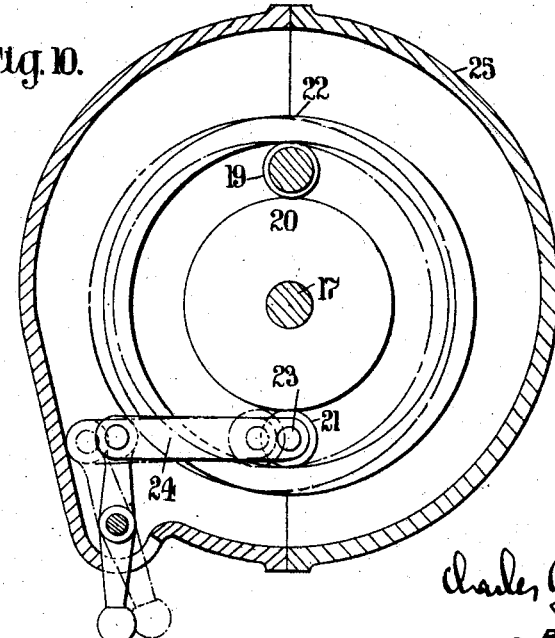
Fig. 10 is a section on the line E—F of Fig. 9.

Thus for example one convenient method of constructing a change speed gear according to the invention, in which a reverse is not required, is shown in Figures 9 and 10. In this case the driving shaft 17 is made integral with or has secured to it a plurality of parallel driving rollers 18, of different diameters, each of which contacts with one of the driven rollers 19, a similar number of which are secured to or made integral with a driven shaft 20. The relative diameters of the several pairs of driving and driven rollers are so selected as to give the various desired speed ratios, and each pair of driving and driven rollers has a separate idler roller 21 and binding ring 22. The idler rollers 21 are loosely mounted on short shafts 23 supported by separate sliding or swinging bearings by means of which the rollers can be moved into or out of engagement. In the form shown in the drawings the idler rollers 21 are mounted on the pivoted arms 24 which are controlled by any suitable means such as a gate change or the like not shown.

In Figs. 9 and 10 one of the idler rollers 21 is shown in full lines in operative position, whilst the in-operative positions are indicated by dotted lines.

The whole gear may be mounted in a casing or gear box 25, which may at the same time provide bearings for the shafts 17 and 20. As before the shafts 17, 20 and 23 on which the driving, driven and idler rollers are mounted, are arranged parallel to each other.

It will of course be clear that if desired the shaft 20, and its rollers 19 could be arranged to be the driving members and shaft 17 and rollers 18 the driven, and the idler rollers 21 could also be arranged to contact with the rollers 19 instead of rollers 18, according to circumstances. In short the parts could be arranged in any of the orders illustrated in Figs. 6, 7 and 8, with such slight modification of constructional details which will readily occur to anyone skilled in the art. The method of moving the idler rollers into engagement and out of engagement can of course also be varied.

The operation of this form of gear will be apparent from the foregoing description. Each separate set of driving, driven and idler rollers with its binding ring operates in the manner of a separate gear according to Figs. 1-8, but as means are provided, such as a gate change or the like, for preventing more than one idler roller being in the operative position at a time, only one set of parts can be driving at any one time, whilst the remaining pairs of driving and driven rollers will rotate idly, and their binding ring hang loosely. Any convenient means may be employed for preventing the ring from slipping or creeping laterally, and these may be of the kinds described above.

Figure 11:
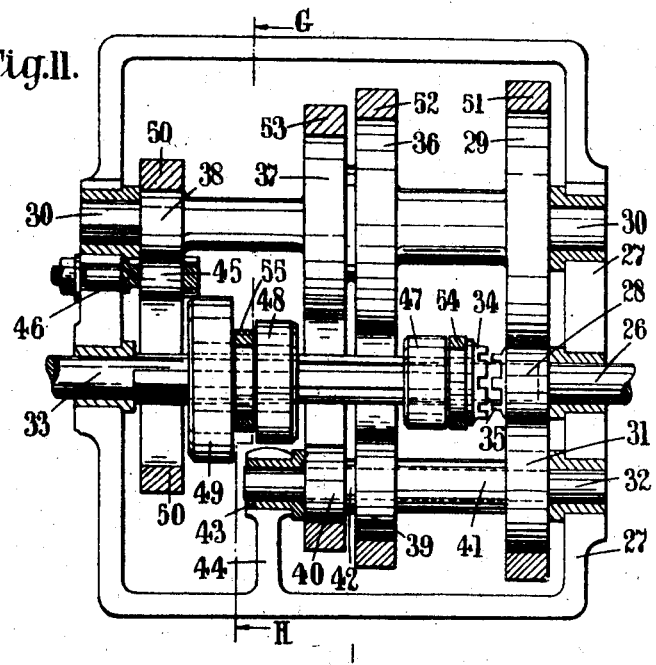
Fig. 11 is a central sectional elevation of another type of multiple or change speed gear embodying a reverse and particularly suitable for automobiles.
Figure 12:
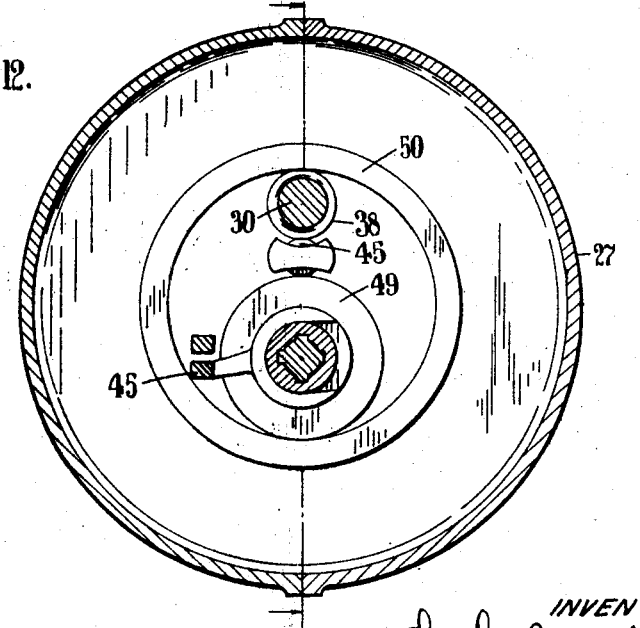
Fig. 12 is a section on the line G—H of Fig. 11.

The invention can also be applied to a change speed gear with reverse, suitable for use on automobiles, and one form of such a device having three forward speeds and a reverse is illustrated in Figs. 11 and 12.

In this case the driving shaft 26 enters the casing 27 through suitable bearings, and has secured to or formed integral with it the driving roller 28, the face of which is in permanent contact on the one side with the face of the lay driven roller 29, fast on lay shaft 30, mounted in the casing 27 and on the other side with the idler roller 31 loosely mounted on the idler lay shaft 32, which is also supported in suitable bearings. The driven shaft 33 enters the casing at the opposite end and is in central alignment with the driving shaft 26, shafts 30 and 32 being parallel with the said driving and driven shafts. The driven shaft terminates in a dog clutch or the like 34, adapted to engage a similar clutch 35 formed or secured to the side of the roller 28, the clutch 34 being preferably slidable on its shaft for the purpose of being moved into and out of engagement with clutch 35, and these parts when in engagement produce the direct drive, straight from the driving to the driven shafts. The movement of the parts for this purpose as well as the other movements for producing the several speeds and reverse, are effected in any convenient manner, as for example by forked levers controlled from a gate change or the like, this part not being shown. In addition to the roller 29 the lay shaft 30 also carries fast on it three further rollers, all four rollers being mounted parallel to each other and two of them 36 and 37 being utilized for the two lower forward speeds, whilst the roller 38 is used for the reverse. The idler lay shaft 32 carries loosely mounted thereon two further idler rollers 39 and 40, which are kept in position on the shaft 32 in alignment with the lay driven rollers 36 and 37 respectively by means of distance pieces or the like 41 and 42. A separate bearing 43, mounted on a convenient support 44 within the casing 27 is provided for the other end of the idler lay shaft 32, which does not extent right through the casing. A separate reverse idler roller 45, loosely mounted on short shaft 46, supported in a bearing in the casing 27 makes contact with the face of reverse lay driven roller 38, but whereas the forward idle rollers 31, 39 and 40 are arranged on that side of the driven and driving shafts 26 and 33 which is remote from the lay shaft 30, the reverse idler roller 45 is mounted between the lay shaft 30 and the driven shaft 33. Three driven rollers 47, 48 and 49 are slidably keyed to the driven shaft 33, and of these, roller 47 is adapted to be slid into operative position contacting with rollers 36 and 39 or to be moved out of engagement with them, roller 47 can similarly be moved into or out of contact with rollers 37 and 40 and roller 49 can similarly be moved into or out of contact with idler roller 45 and the binding ring 50 disposed around the roller 38, and the driven shaft 33, and which is of such a size as to make a close fit around rollers 38 and 49 when the latter is moved into the operative position.

The movement of the sliding rollers 47, 48 and 49 is controlled by members 54 and 55 controlled from any suitable gate or like change speed device, co-operating with forked levers or the like, and these may also serve to limit the movement of the said rollers and of course to prevent more than one gear being in operative position at a time.

The binding ring 51 is disposed around and makes a close fit with the rollers 29 and 31, whilst the rings 52 and 53 are similarly disposed around rollers 36, 39 and 37, 40 respectively. All rollers and binding rings employed in this gear are of the parallel type, and the various diameters as well as the widths of their driving faces are suitably selected according to the desired gear ratios and the power to be transmitted.

The operation of this form of device is as follows:—

In the position shown in Fig. 11 the gear is in the neutral position, no power being transmitted. In order to obtain the lowest forward or first speed the roller 48 is moved into contact with rollers 37 and 40. If now the driving shaft 26 is rotated power will be transmitted from roller 28 to roller 29, lay shaft 30, and through roller 37 to roller 48 and thence through the key way to the driven shaft 33 which will be driven in the same direction as, but at a slower speed than the driving shaft 26. The necessary binding pressure will be applied by means of the idler rollers 31 and 40 and rings 51 and 53 whilst the remaining rollers and rings will rotate idly. To obtain the second speed roller 48 is again moved into in-operative or neutral position, and roller 47 into contact with rollers 36 and 39 when the shaft 33 will again be rotated in the same direction as shaft 26, but at a higher speed than before owing to the gear ratio between the diameters of rollers 36 and 47 being higher than that of rollers 37 and 48. To obtain the third or top gear both rollers 48 and 47 should be in the in-operative or neutral positions and the dog clutches 34 and 35 be moved into engagement. In this position there is a direct drive from shaft 26 to shaft 33 and all rollers and rings rotate idly. The reverse is obtained with rollers 48 and 47 in inoperative or neutral positions and the dog clutches 34 and 35 disengaged by moving roller 49 into contact with idler roller 45 and ring 50. In this position owing to the idler roller 45 being interposed between the lay roller 38 and driven roller 49 the shaft 33 will be rotated in the opposite direction to that of shaft 26, but at a much reduced speed owing to the gear ratio employed.

Any convenient means, which may or may not be of the kinds described in the foregoing in connection with other modifications, may be employed for keeping the several rollers and rings in correct positions laterally, and for preventing lateral slipping and/or creeping.

It should be noted that the methods described and illustrated in Figs. 9-12 for changing gears are not limited to use with the particular modifications in connection with which they have been described but could also be employed with other developments of the method of gear construction, described herein, or they could even be used for disconnecting a simple single ratio gear.

In the case of multiple speed gears as many different speeds or gear ratios as are desired can of course be employed and whenever desired the speeds and gear ratios can of course be compounded for double or more reduction or increase.

In gears constructed according to the present invention there will be practically no journal loads, other than the usual tangential torque load, and as long as the amount of difference between the relative centre lines of the three rollers and the binding ring does not cause the angle at the contacting points to exceed the natural angle of repose of the materials employed there can be no slipping and it is part of the invention to construct the parts, and particularly the outer binding of such a shape and strength to keep this angle within the said limit.

In the modifications illustrated in Figs. 1-3 reference has been made to the fact that certain of the roller bearings are arranged to be movable to allow for variations in stresses, and it should be noted that in all gears constructed according to the present invention including all modifications illustrated in the drawings, means must be provided for this purpose. These means may consist of allowing a certain play in some or all of the bearings, in mounting some of the rollers in a manner similar to that illustrated for the idler rollers in Figures 9 and 10, or in other convenient means, whilst in some cases, the elasticity of the metal of the shafts themselves may be sufficient for the purpose.

The amount of power which the gear will transmit will be proportional to the surface speed of the contacting faces and to the width of the said faces, this surface length and speed being based upon the elasticity of the materials employed for the rollers and ring. If desired a safety ring or the like of soft iron or other protecting means may be shrunk or otherwise disposed around each of the binding rings as a precaution against the same breaking.

I claim:—

1. A means for transmission of power comprising a driving roller, a driven roller, an idler roller and a binding ring for exerting pressure on said rollers and transmitting rotary power from the driving roller to the driven roller, said binding ring being of less diameter than the sum of the diameters of the rollers it surrounds.

2. A means for transmission of power comprising a set of parallel faced rollers, said set being composed of a driving roller, a driven roller and an idler roller all disposed on parallel axes with the axial centers of each set normally in substantial alignment, and a binding ring disposed around and supported by said set of rollers, said binding ring being of less diameter than the sum of the diameters of the rollers it surrounds.

3. A means for transmission of power comprising a plurality of sets of rollers and a binding ring for each set of rollers each comprising a driving roller, and driven roller, and an idler roller, and means for selectively causing any one of said idler rollers to bind with respect to its ring and thereby cause the driven roller of that set to be actuated, said binding ring being of less diameter than the sum of the diameters of the rollers which it surrounds.

4. A means for transmission of power comprising a plurality of sets of rollers and a binding ring for each set of rollers each comprising a driving roller, a driven roller, and an idler roller, the idler roller of each set being rotatable independent of the idler rollers of the other sets of rollers, and means for selectively causing any one of said idler rollers to bind with respect to its ring and thereby cause the driven roller of that set to be actuated, said binding ring being of less diameter than the sum of the diameters of the rollers which it surrounds.

5. A means for the transmission of power comprising a plurality of sets of rollers, each set including a driving roller, a driven roller, and an idler roller, and each set having a binding ring, and each set having a different speed ratio from the other sets, and means for causing any one of the driving rollers to actuate its ring and driven roller and permit the rollers of the other sets to rotate idly, said binding ring being of less diameter than the sum of the diameters of the rollers which it surrounds.

6. A means for the transmission of power comprising a drive shaft having a roller thereon, a lay shaft having a plurality of rollers of different diameters, one of which is permanently driven by said roller on the driving shaft, a plurality of rollers on the driven shaft, separate idler rollers and binding rings for each set of driving and driven rollers, said rings being of a diameter less than the combined diameters of the rollers, and means for selectively placing one or the other of the sets of lay driving and idler rollers into driving engagement.

7. A means for the transmission of power comprising a drive shaft having a driving roller thereon, a lay shaft having a plurality of rollers of different diameters thereon, one of said plurality of rollers being permanently driven by said roller on the driving shaft, a driven shaft, a plurality of rollers slidably keyed to the driven shaft, separate idler rollers and binding rings for each set of driving and driven rollers, and means for selectively sliding any one of said keyed rollers into cooperative relation to the other rollers and ring of that set for driving the driven shaft through that set of rollers.

8. A means for transmission of power comprising a driving roller, a driven roller, an idler roller and a binding ring for exerting pressure on said rollers to transmit rotary power from the driving roller to the driven roller, said binding ring having an internal diameter slightly less than the combined diameters of said rollers.

9. A means for transmission of power comprising a set of parallel faced rollers, said set being composed of a driving roller, a driven roller and an idler roller all disposed on parallel axes with the axial centers of each set normally in substantial alignment, and a binding ring disposed around and supported by said set of rollers, said binding ring having an internal diameter slightly less than the combined diameters of said rollers.

10. A means for transmission of power comprising a purality of sets of rollers and a binding ring for each set of rollers each comprising a driving roller, and driven roller, and an idler roller, and means for selectively causing any one of said idler rollers to bind with respect to its ring and thereby cause the driven roller of that set to be actuated, said binding rings having an internal diameter slightly less than the combined diameters of said rollers of its set.

11. A means for transmission of power comprising a plurality of sets of rollers and a binding ring for each set of rollers each comprising a driving roller, a driven roller, and an idler roller, the idler roller of each set being rotatable independent of the idler rollers of the other sets of rollers, and means for selectively causing any one of said idler rollers to bind with respect to its ring and thereby cause the driven rollers of that set to be actuated, said binding rings having an internal diameter slightly less than the combined diameters of said rollers of its set.

12. A means for the transmission of power comprising a plurality of sets of rollers, each set including a driving roller, a driven roller, and an idler roller, and each set having a binding ring, and each set having a different speed ratio from the other sets, and means for causing any one of the driving rollers to actuate its ring and driven roller and permit the rollers of the other sets to rotate idly, each binding ring having an internal diameter slightly less than the combined diameters of said rollers of its set.

13. A means for the transmission of power comprising a drive shaft having a roller thereon, a lay shaft having a plurality of rollers of different diameters, one of which is permanently driven by said roller on the driving shaft, a plurality of rollers on the driven shaft, separate idler rollers and binding rings for each set of driving and driven rollers, and means for selectively placing one or other of the sets of lay driving and idler rollers into driving engagement, each binding ring having an internal diameter slightly less than the combined diameters of said rollers of its set.

14. A means for the transmission of power comprising a drive shaft having a roller thereon, a lay shaft having a plurality of rollers of different diameters thereon, one of said plurality of rollers being permanently driven by said roller on the driving shaft, a driven shaft, a plurality of rollers slidably keyed to the driven shaft, separate idler rollers and binding rings for each set of driving and driven rollers, and means for selectively sliding any one of said keyed rollers into cooperative relation to the other rollers and ring of that set for driving the driven shaft through that set of rollers, each binding ring having an internal diameter equal to or slightly less than the combined diameter of said rollers of its set.

15. A means for transmission of power comprising a set of parallel faced rollers said set being composed of a driving roller, a driven roller and an idler roller all disposed on parallel axes with the axial centers of each set normally in substantial alignment, and a binding ring disposed around and supported by said set of rollers, said binding ring having an internal diameter slightly less than the combined diameters of said rollers, and said driving and idler rollers being mounted in movable bearings.

16. A means for transmission of power comprising a plurality of sets of rollers and a binding ring for each set of rollers each comprising a driving roller, a driven roller, and an idler roller, the idler roller of each set being rotatable independent of the idler rollers of the other sets of rollers, and means for selectively causing any one of said idler rollers to bind with respect to its ring and thereby cause the driven roller of that set to be actuated, each binding ring having an internal diameter slightly less than the combined diameters of said rollers of its set, and said driving and idler rollers being mounted in movable bearings.

17. A means for the transmission of power comprising a driving roller, a driven roller, an idler roller and binding ring having a single driving face and means for retaining said rollers and binding ring against axial displacement, said binding ring being of less diameter than the sum of the diameters of the rollers it surrounds.

18. A means for the transmission of power comprising a driving shaft and a driven shaft, rollers on each of said shafts, a lay shaft having a plurality of rollers formed thereon, an idler roller for each roller on said lay shaft, a binding ring for each set of rollers of a diameter slightly less than the combined diameters of the rollers which it surrounds, and means connected to the rollers on the driven shaft, for selecting the desired set of rollers and ring to drive the driven shaft in the desired direction and at the desired speed.

19. A means for transmission of power comprising a driving shaft, a driven shaft, rollers on each of said shafts, a lay shaft having a plurality of rollers formed thereon, one for each roller on said driving and driven shaft, an idler roller for each of the rollers on said lay shaft, an idler roller, a roller on said lay shaft and their cooperating roller on said driving and driven shafts forming a set, a binding ring for each set of slightly less diameter than the combined diameters of the rollers in that set, and means for selectively driving the driven shaft through any set of rollers and binding ring.

20. A means for transmission of power comprising a driving shaft, a driven shaft rollers on each of said shafts, a lay shaft having a plurality of rollers formed thereon, one for each roller on said driving and driven shaft, an idler roller for each of the rollers on said lay shaft, an idler roller, a roller on said lay shaft and their cooperating rollers on said driving and driven shafts forming a set, a binding ring for each set of slightly less diameter than the combined diameters of the rollers in that set, means for directly connecting said driving and said driven shafts together and means for selectively driving said driven shaft through any set of rollers and binding ring.

21. A means for the transmission of power comprising a driving shaft having a roller thereon, a lay shaft having a plurality of rollers, formed thereon, a driven shaft having a plurality of rollers, idler rollers for each roller on said driving and driven shafts, a binding ring for each set of rollers each set comprising an idler roller, a lay shaft roller, and a driving or driven shaft roller, the diameter of the binding ring being less than the combined diameters of the rollers it surrounds and means for selecting the desired set of rollers and rings to actuate the driven shaft from the driving shaft.

22. A means for the transmission of power comprising a driving shaft having a roller thereon, a lay shaft having a plurality of rollers formed thereon, a driven shaft having a plurality of rollers slidably mounted thereon, idler rollers for each roller on said driving and driven shafts, a binding ring for each set of rollers each set comprising an idler roller, a lay shaft roller and a driving or driven shaft roller, the diameter of the binding ring being less than the combined diameters of the rollers it surrounds and means for sliding the desired roller on said driven shaft into operative engagement with its lay shaft roller, idler roller and ring to actuate the driven shaft.

In witness whereof I affix my signature.

CHARLES GEORGE GARRARD.